E. BÖHM.
INSECT TRAP, ESPECIALLY FOR FLIES.
APPLICATION FILED APR. 20, 1909.

970,784.

Patented Sept. 20, 1910.

Witnesses:
Joseph E. Cavanaugh
Josephus Weyl

Inventor:
Emil Böhm
By his Attorney:
Max D. Ordmann

UNITED STATES PATENT OFFICE.

EMIL BÖHM, OF FINKENKRUG, NEAR SEEGEFELD, GERMANY.

INSECT-TRAP, ESPECIALLY FOR FLIES.

970,784. Specification of Letters Patent. Patented Sept. 20, 1910.

Application filed April 20, 1909. Serial No. 491,118.

*To all whom it may concern:*

Be it known that I, EMIL BÖHM, of Finkenkrug, near Seegefeld, Germany, and a resident of Ranger's House, Finkenkrug, have invented certain new and useful Improvements in Insect-Traps, Especially for Flies, of which the following is a specification.

The present invention relates to insect traps and has for its object to provide traps whereby insects can be caught and destroyed in great quantities.

With this object in view, my invention consists in a trap comprising a receptacle containing a poisonous liquid and having a source of heat or light or both, whereby the insects are rendered unconscious and are caused to fall into a receptacle and killed in the liquid contained therein.

My new trap has the advantage over the hitherto known traps of similar kind, in that it is portable and not stationary, so that the trap can be carried from place to place and thus be brought to a place where insects are known to accumulate in great masses.

Figure 1:
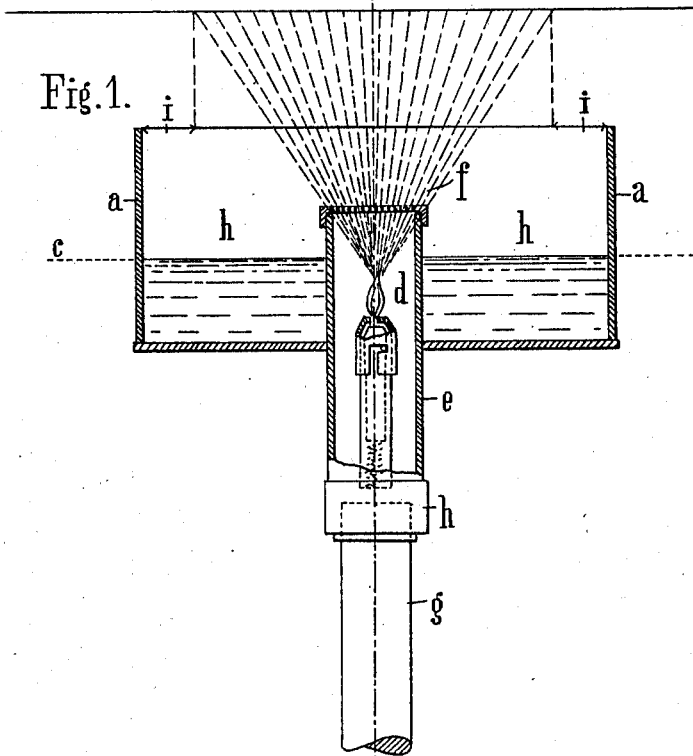
Figure 2:
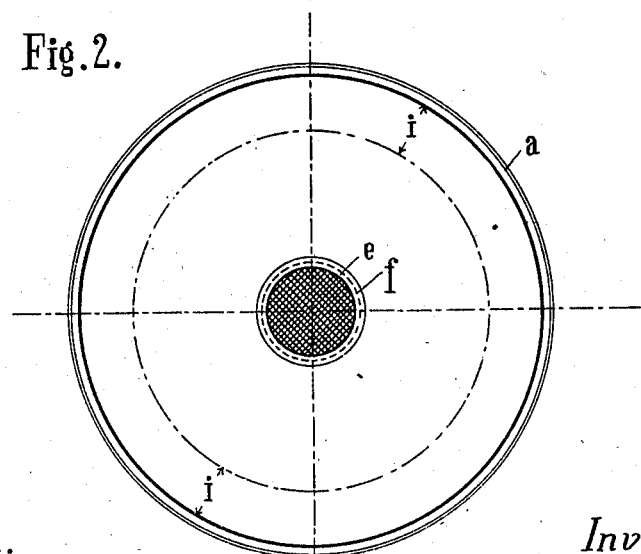

In the accompanying drawing forming a part of this specification and in which similar reference letters denote corresponding parts, Figure 1 is a vertical section through the trap and Fig. 2 a plan view thereof.

The trap consists of a receptacle $a$ filled to a certain level $c$ with a poisonous liquid $b$ and a source of heat $d$ or light, as for instance, a candle, lamp or the like, arranged below the level of the liquid and separated from the latter in the receptacle $a$ by a chimney $e$ of any suitable fireproof and opaque material. The upper margin of the chimney $e$ is closed by a cover $f$ of wire gauze preventing the insects from dropping into the source of heat or light.

The chimney $e$ serves to direct the rays of heat or light or both in such manner that the same leave the trap a certain distance from the upper margin of the receptacle $a$ so that according to the distance the trap is held from the ceiling, or the like, the rays will form a zone between themselves and the upper margin of the vessel $a$, in which the rays of heat are of such low temperature that they practically do not affect the insects and will not frighten them, while the heat directly above the vessel $a$ is of such strength as to render the insects unconscious and cause them to drop into the poisonous liquid.

In using a source of heat which radiates at the same time rays of light, the same must be arranged in the chimney at such a low level that the rays of light, in leaving the chimney do not strike the upper margin of the vessel, but form according to the distance the trap is held from the ceiling or the like, a zone $i$ which is free from heat and light, so as not to frighten the insects. The sleeve $h$ of the lamp serves to receive a handle $g$ for carrying the trap from place to place.

What I claim and desire to secure by Letters Patent is:

1. In an insect trap of the character described, comprising a vessel containing a poisonous liquid, a source of heat or light below the level of the liquid, an opaque chimney surrounding the said source and extending through the liquid and beyond the level thereof, to such an extent that the diameter of the base of the cone of the emitted light or heat in the plane of the top of the vessel is smaller than the diameter of the latter.

2. In an insect trap of the character described, comprising a vessel containing a poisonous liquid, a source of heat or light below the level of the liquid, an opaque chimney surrounding the said source and extending through the liquid and beyond the level thereof, to such an extent that the diameter of the base of the cone of the emitted light or heat in the plane of the top of the vessel is smaller than the diameter of the latter, and a perforated cover at the spout of the chimney.

Signed at Berlin, Germany, this 29th day of March 1909.

EMIL BÖHM.

Witnesses:
 HENRY HASPER,
 WOLDEMAR HAUPT.